(12) United States Patent
Kuno et al.

(10) Patent No.: US 6,406,117 B2
(45) Date of Patent: Jun. 18, 2002

(54) IMAGE RECORDING METHOD

(75) Inventors: Masashi Kuno, Obu; Masashi Ueda, Nagoya; Masahiro Nishihara, Nagoya, all of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/757,649

(22) Filed: Jan. 11, 2001

(30) Foreign Application Priority Data

Jan. 12, 2000 (JP) ........................................ 2000-006250

(51) Int. Cl.[7] .............................. B41J 2/205; B41J 2/21
(52) U.S. Cl. ........................................... 347/15; 347/43
(58) Field of Search ...................... 347/15, 43; 358/1.1, 358/518, 523

(56) References Cited

U.S. PATENT DOCUMENTS

| 4,500,919 A | 2/1985 | Schreiber .................... 358/518 |
| 4,959,711 A | 9/1990 | Hung et al. .................. 358/523 |
| 5,045,952 A | 9/1991 | Eschbach ..................... 358/447 |
| 5,172,223 A | 12/1992 | Suzuki et al. ................ 358/529 |
| 5,416,614 A | 5/1995 | Crawford ..................... 358/530 |
| 5,774,146 A | * 6/1998 | Mizutani ...................... 347/43 |
| 5,781,206 A | * 7/1998 | Edge ............................ 347/19 |

\* cited by examiner

*Primary Examiner*—Thinh Nguyen
(74) *Attorney, Agent, or Firm*—Oliff & Berridge, PLC

(57) ABSTRACT

Of the four basic colors of cyan, magenta, yellow, and black, each of two basic colors of cyan and magenta is expressed by two different inks, that is, light ink and normal ink which have different densities for the corresponding color. For each of the basic colors of cyan and magenta, after tone correction is performed in S2 (S108) to attain a linear input/output characteristic, an optimum group of conversion tables T3 that matches the user's selected set of printer characteristic is selected in S110 from the plurality of groups of conversion tables T3, which have been prepared in advance in correspondence with a plurality of sets of printer characteristics. Color data $Ci''$, $Mi''$ for each of the cyan and magenta basic colors is converted in S112 into color data Cl and Cn and Ml and Mn for light ink and normal ink of the corresponding color based on the selected group of conversion tables T3.

19 Claims, 7 Drawing Sheets

[LIGHT INK CONVERSION TABLE]

| INPUT COLOR DATA | 0 | 1 | 2 | ... | 100 | 101 | 102 | ... | 254 | 255 |
|---|---|---|---|---|---|---|---|---|---|---|
| LIGHT INK DATA | 0 | 2 | 4 | ... | 151 | 153 | 153 | ... | 1 | 0 |

[NORMAL INK CONVERSION TABLE]

| INPUT COLOR DATA | 0 | 1 | 2 | ... | 100 | 101 | 102 | ... | 254 | 255 |
|---|---|---|---|---|---|---|---|---|---|---|
| NORMAL INK DATA | 0 | 0 | 0 | ... | 1 | 2 | 4 | ... | 253 | 255 |

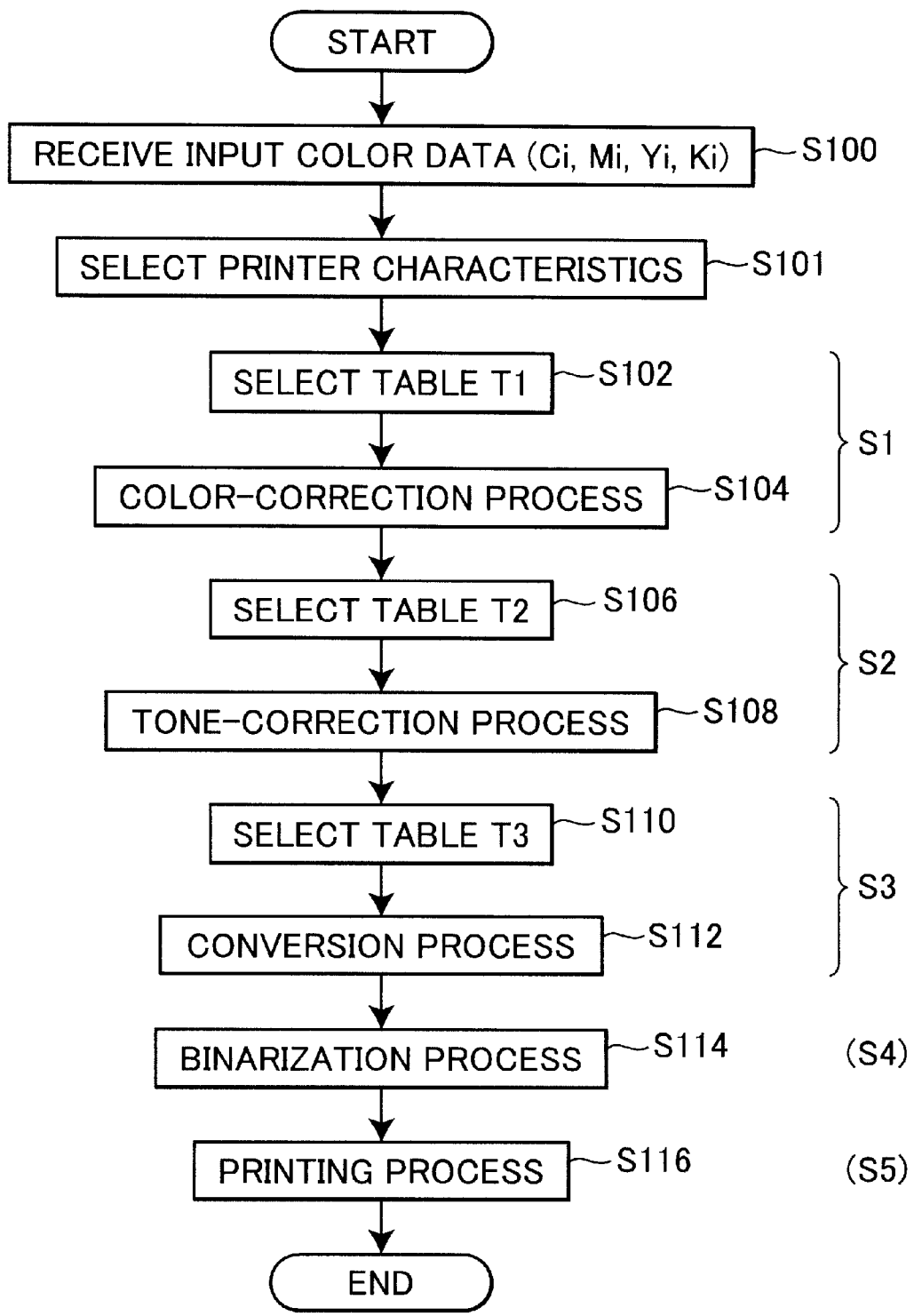

| COLOR DATA | | | | COLOR-CORRECTED COLOR DATA | | | |
|---|---|---|---|---|---|---|---|
| C | M | Y | K | C' | M' | Y' | K' |
| 0 | 0 | 0 | 0 | 0 | 0 | 0 | 0 |
| 0 | 0 | 0 | 32 | 2 | 4 | 0 | 30 |
| ⋮ | ⋮ | ⋮ | ⋮ | ⋮ | ⋮ | ⋮ | ⋮ |
| 0 | 0 | 0 | 224 | 1 | 2 | 5 | 220 |
| 0 | 0 | 0 | 255 | 3 | 1 | 10 | 254 |
| 0 | 0 | 32 | 0 | 6 | 0 | 35 | 2 |
| 0 | 0 | 32 | 32 | 0 | 1 | 31 | 28 |
| ⋮ | ⋮ | ⋮ | ⋮ | ⋮ | ⋮ | ⋮ | ⋮ |
| 0 | 0 | 32 | 224 | 1 | 5 | 29 | 218 |
| 0 | 0 | 32 | 255 | 0 | 0 | 29 | 255 |
| 0 | 0 | 64 | 0 | 5 | 7 | 70 | 10 |
| 0 | 0 | 64 | 32 | 10 | 10 | 60 | 28 |
| ⋮ | ⋮ | ⋮ | ⋮ | ⋮ | ⋮ | ⋮ | ⋮ |
| 0 | 0 | 64 | 224 | 2 | 7 | 59 | 230 |
| 0 | 0 | 64 | 255 | 1 | 4 | 66 | 247 |
| ⋮ | ⋮ | ⋮ | ⋮ | ⋮ | ⋮ | ⋮ | ⋮ |

T1

FIG.9(a)
[LIGHT INK CONVERSION TABLE]
| COLOR DATA | LIGHT INK DATA | COLOR DATA | LIGHT INK DATA | COLOR DATA | LIGHT INK DATA |
|---|---|---|---|---|---|
| 0 | 0 | ⋮ | ⋮ | ⋮ | ⋮ |
| 1 | 2 | | | | |
| 2 | 4 | 126 | 252 | 248 | 14 |
| 3 | 6 | 127 | 254 | 249 | 12 |
| 4 | 8 | 128 | 255 | 250 | 10 |
| 5 | 10 | 129 | 254 | 251 | 8 |
| 6 | 12 | 130 | 252 | 252 | 6 |
| 7 | 14 | 131 | 250 | 253 | 4 |
| ⋮ | ⋮ | ⋮ | ⋮ | 254 | 2 |
| | | | | 255 | 0 |
T3l
FIG.9(b)
[NORMAL INK CONVERSION TABLE]
| COLOR DATA | NORMAL INK DATA | COLOR DATA | NORMAL INK DATA | COLOR DATA | NORMAL INK DATA |
|---|---|---|---|---|---|
| 0 | 0 | ⋮ | ⋮ | ⋮ | ⋮ |
| 1 | 0 | | | | |
| 2 | 0 | 126 | 0 | 248 | 241 |
| 3 | 0 | 127 | 0 | 249 | 243 |
| 4 | 0 | 128 | 1 | 250 | 245 |
| 5 | 0 | 129 | 3 | 251 | 247 |
| 6 | 0 | 130 | 5 | 252 | 249 |
| 7 | 0 | 131 | 7 | 253 | 251 |
| ⋮ | ⋮ | ⋮ | ⋮ | 254 | 253 |
| | | | | 255 | 255 |
T3n
FIG.10
REFERENCE TONE VALUE
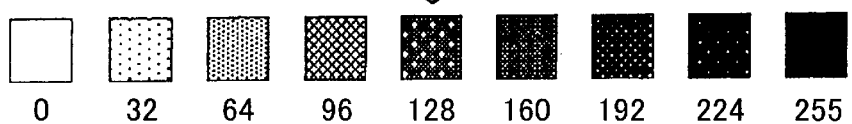
0   32   64   96   128   160   192   224   255

IMAGE RECORDING METHOD

BACKGROUND OF THE INVENTION

1. Field of the Invention

The present invention relates to an image recording method for recording color images on a recording medium by using a plurality of colored inks that have different densities of the same color, to express a specific basic color.

2. Description of Related Art

In recent years, color printers have come into broad distribution as image recording devices for recording computer-processed images in different tones and with a plurality of colors. Such color printers eject different colors of ink from a recording head. Generally, color printers reproduce images using ink of four basic colors of cyan (C), magenta (M). yellow (Y), and black (K), which will be referred to as "normal inks" hereinafter.

SUMMARY OF THE INVENTION

In order to improve image quality, it is conceivable that color printers use "light ink" together with normal ink in order to reproduce a single specific color such as cyan (C) or magenta (M). Each light ink has a density lower than its corresponding normal ink. In other words, light ink and, normal ink are different inks that have different densities of the same basic color.

FIG. 1 represents how images can be reproduced using both normal and light inks for some basic color, such as cyan (C) or magenta (M). As shown in FIG. 1, when color data, inputted from a computer or the like, has a small tone value, then the basic color is reproduced using the light ink only. Variations in the tone value of the color data can be reproduced by changing the dot density of the light ink. Once the tone value of the color data reaches a predetermined reference tone value ("100" in this example), then normal ink starts being used together with light ink. As the tone value of the color data increases further from the reference tone value, the dot density of the light ink is gradually reduced, while the dot density of the normal ink is gradually increased to reproduce the desired tone of the basic color.

In order to form an image on a recording medium using light and normal inks in the manner described above, it is conceivable that a light ink conversion table and a normal ink conversion table are prepared in advance for each of the basic colors, such as cyan (C) and magenta (M), as shown in FIGS. 2(a) and 2(b).

In order to produce the light ink conversion table and the normal ink conversion table, the reference tone value, which indicates when to start using normal ink, should be first determined. It is conceivable that the reference tone value be determined in a manner described below.

A plurality of color patches are outputted onto a recording medium based on a plurality of tone values that differ from one another in stepwise increments. Then, normal ink is ejected in a predetermined dot density (for example, 1%) onto each color patch. An operator visually observes the color patches, and selects one or more allowable color patches where the normal ink does not give a highly noticeable dot "rough" appearance. The operator then selects one color patch that has been produced by the smallest tone value among the selected one or more allowable color patches. The operator sets, as the reference tone value, the tone value of his/her finally-selected color patch.

Then, the conversion tables of FIGS. 2(a) and 2(b) are prepared to represent the input/output characteristics of FIG. 1. Based on the thus obtained conversion tables, color data inputted, from a computer or the like, will be converted into ink data for light ink and ink data for normal ink. Light ink and normal ink will be selectively ejected, based on the thus obtained ink data, to form an image on the recording medium.

It is noted, however, that the density level actually outputted onto a recording medium changes according to various printer characteristics, such as the type or model of the printer, the resolution, the type of ink used, and the type of recording medium. For example, it is assumed that dot "roughness" or light ink "bleeding (blurring)" do not appear noticeable when a basic color is reproduced by outputting light ink and normal ink under some condition onto a particular kind of recording medium. However, when printing is performed onto another kind of recording medium with different shade, different quality, or different absorbency, even if the printing is performed under the same condition, dot "roughness" and/or light ink "bleeding" will possibly appear noticeable. It therefore becomes impossible to always record images under optimum conditions.

Additionally, when reproducing a basic color using light ink and normal ink, as shown in FIG. 3, a point of inflection tends to occur in the output density level of the basic color at the reference tone level, that is, at the tone level where normal ink starts being used. At the inflection point, the first derivative of the output density level changes discontinuously. Such an inflection point can result in pseudo contours in the recorded image.

It is conceivable that, in order to suitably reproduce colors based on color data inputted from a computer or similar source, color correction and tons correction be performed onto the inputted color data using previously-prepared color correction table and tone correction table. Each of the color correction table and tone correction table is generally provided with correction values for some tone values, which are arranged at a fixed interval, rather than for all the tone values. Interpolation is therefore employed to calculate approximate correction values for tone values with no corresponding correction values. Color correction and tone correction are performed using the approximate correction values. However, precision of the interpolation process drops when the output density level for input color data includes the inflection point as described above with reference to FIG. 3. It becomes impossible to determine a suitable approximate correction value, and consequently impossible to perform suitable color correction or suitable tone correction.

It is therefore a first objective of the present invention to provide an image recording method that enables always recording images in a suitable condition, regardless of changes in printer characteristics, when expressing a basic color using different inks that have different densities of the same color.

It is a second objective of the present invention to provide an image recording method that enables performing suitable correction operation, without generation of pseudo contours in the image recorded on the recording medium, when expressing a basic color using different inks that have different densities of the same color.

In order to attain the above and other objectives, the present invention provides a method for recording a color image on a recording medium by expressing at least one basic color using a plurality of inks that have different densities of the corresponding color, the method comprising the steps of: preparing a plurality of conversion tables, each for converting color data of at least one basic color into converted color data of the plurality of inks that have different densities of the corresponding color, each conversion table matching one of a plurality of sets of printer characteristics; selecting a set of printer characteristics, with which printing operation is desired to be performed; selecting one conversion table from the plurality of conversion tables in accordance with the selected set of printer characteristics: converting, based on the selected conversion table, the color data of each of the least one basic color into converted color data of the plurality of inks that have different densities of the corresponding color; and performing printing operation to record a color image on a recording medium based on the converted color data with the selected set of printer characteristics.

As used with respect to the present invention, "printer characteristics" refers to various conditions that influence recorded images. Representative examples of the printer characteristics include; the type of recording medium, the type of ink used in the printer, the resolution of the printer, the model or type of the printer, which determines the unique qualities of the subject printer, and the print speed of the printer.

The printer characteristics selecting step may include the step of allowing a user to select his/her desired set of printer characteristics.

According to another aspect, the present invention provides a method for recording a color image on a recording medium by expressing at least one basic color using a plurality of inks that have different densities of the corresponding color, the method comprising the steps of: receiving color data of at least one basic color: converting the color data of each of at least one basic color into converted color data of the plurality of inks that have different densities of the corresponding color, while performing tone correction on the color data of each of the at least one basic color; and performing printing operation to record a color image on a recording medium based on the converted color data.

After performing the tone correction on the received color data of each of the at least one basic color, the tone-corrected color data of each of the at least one basic color may be converted into the converted color data of the plurality of inks that have different densities of the corresponding color.

The method may further comprise the steps of: preparing a conversion table in advance; outputting, in accordance with the conversion table, color patches of each of the at least one basic color onto a recording medium using the plurality of inks that have different densities of the corresponding color; measuring density levels of the color patches; and preparing a tone correction table based on the measured density levels, and wherein the tone correction performing step performs the tone correction using the tone correction table, and the conversion step performs the conversion operation using the conversion table.

The tone correction table may be prepared to achieve a linear relationship between the color data of each of the at least one basic color and density levels to be obtained, the tone correction table being prepared by first producing a measurement curve that represents the density levels measured for the color patches and then by calculating a tone correction curve based on the measurement curve and on a predetermined linear line that represents the linear relationship.

Here, "linear relationship" refers to when the color data of the basic colors and the measured density levels achieve a proportional relationship.

The plurality of different inks may include a light ink having a predetermined density and a normal ink having another predetermined density greater than that of the light ink. The conversion table may represent, for each of the light and normal inks, correspondence between a plurality of sets of color data and a plurality of sets of converted color data, the converted color data for the normal ink having zero values in correspondence with the color data of values smaller than a predetermined reference value. The color patches may be produced by using the conversion table to convert several sets of color data which include one set of color data of the predetermined reference value, into several sets of converted color data for each of the light and normal inks, and by producing each of the several color patches based on the corresponding set of converted color data for the light ink and on the corresponding set of converted color data for the normal ink.

A plurality of conversion tables may be prepared for a plurality of different sets of printer characteristics, a plurality of tone correction tables being prepared for the plurality of different sets of printer characteristics. In this case, the method may further comprise the steps of selecting a set of printer characteristics, with which printing operation is desired to be performed; selecting one tone correction table from the plurality of tone correction tables in accordance with the selected set of printer characteristics, the tone correction performing step performing the tone correction using the selected tone correction table; and selecting one conversion table from the plurality of conversion tables in accordance with the selected set of printer characteristics, the conversion step performing converting operation using the selected conversion table.

According to another aspect, the present invention provides an apparatus for recording a color image on a recording medium by expressing at least one basic color using a plurality of inks that have different densities of the corresponding color, the apparatus comprising: a table storing unit storing a plurality of conversion tables, each for converting color data of at least one basic color into converted color data of the plurality of inks that have different densities of the corresponding color, each conversion table matching one of a plurality of sets of printer characteristics; a printer characteristics selection unit selecting a set of printer characteristics, with which printing operation is desired to be performed; a table selection unit selecting one conversion table from the plurality of conversion tables in accordance with the selected set of printer characteristics; a conversion unit converting, based on the selected conversion table, the color data of each of the least one basic color into converted color data of the plurality of inks that have different densities of the corresponding color; and a printing unit performing printing operation to record a color image on a recording medium based on the converted color data with the selected set of printer characteristics.

According to another aspect, the present invention provides an apparatus for recording a color image on a recording medium by expressing at least one basic color using a plurality of inks that have different densities of the corresponding color, the apparatus comprising: a receiving unit receiving color data of at least one basic color; a conversion unit converting the color data of each of at least one basic color into converted color data of the plurality of inks that have different densities of the corresponding color, while performing tone correction on the color data of each of the at least one basic color; and a printing unit performing printing operation to record a color image on a recording medium based on the converted color data.

The conversion unit may include: a tone correction unit performing the tone correction on the received color data of each of the at least one basic color; and a converting unit converting the tone-corrected color data of each of the at least one basic color into the converted color data of the plurality of inks that have different densities of the corresponding color.

According to another aspect, the present invention provides a data storage medium storing, in a manner readable by a computer, data of a program for recording a color image on a recording medium by expressing at least one basic color using a plurality of inks that have different densities of the corresponding color, the program comprising: a program of preparing a plurality of conversion tables, each for converting color data of at least one basic color into converted color data of the plurality of inks that have different densities of the corresponding color, each conversion table matching one of a plurality of sets of printer characteristics; a program of selecting a set of printer characteristics, with which printing operation is desired to be performed; a program of selecting one conversion table from the plurality of conversion tables in accordance with the selected set of printer characteristics; a program of converting, based on the selected conversion table, the color data of each of the least one basic color into converted color data of the plurality of inks that have different densities of the corresponding color; and a program of performing printing operation to record a color image on a recording medium based on the converted color data with the selected set of printer characteristics.

According to still another aspect, the present invention provides a data storage medium storing, in a manner readable by a computer, data of a program for recording a color image on a recording medium by expressing at least one basic color using a plurality of inks that have different densities of the corresponding color, the program comprising: a program of receiving color data of at least one basic color; a program of converting the color data of each of at least one basic color into converted color data of the plurality of inks that have different densities of the corresponding color, while performing tone correction on the color data of each of the at least one basic color; and a program of performing printing operation to record a color image on a recording medium based on the converted color data.

BRIEF DESCRIPTION OF THE DRAWINGS

The above and other objects, features and advantages of the invention will become more apparent from reading the following description of the embodiment taken in connection with the accompanying drawings in which:

FIG. 5(b) is a flowchart executed by the system of the present embodiment to attain the image recording processes of FIG. 5(a);

FIG. 9(a) is a schematic view showing a light ink conversion table representing the relationship, between the color data and light ink data, shown in FIG. 8;

FIG. 9(b) is a schematic view showing a normal ink conversion table representing the relationship, between the color data and normal ink data, shown in FIG. 8; and FIG. 10 is a schematic view showing color patches produced when preparing the light ink conversion table, the normal ink conversion table, and the tone correction table.

DETAILED DESCRIPTION OF THE EMBODIMENT

Next, an image recording system according to an embodiment of the present invention will be described while referring to the attached drawings.

Figures 1, 2A, 2B:
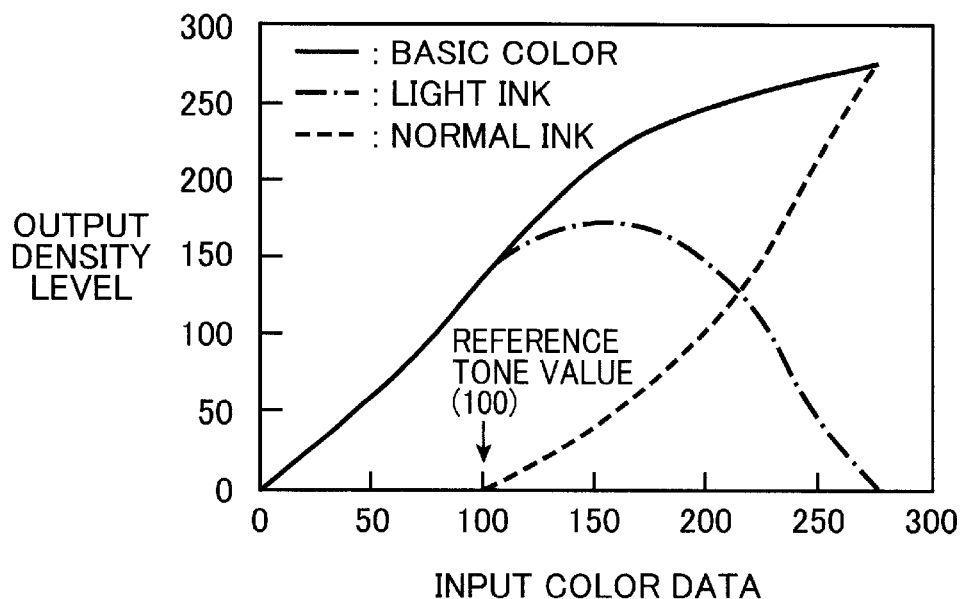
FIG. 1 is a graph showing the relationship between input color data and an output density level in a conceivable image recording process, for a particular basic color that is reproduced using two inks that have different densities of the same color.
FIG. 2(a) is a schematic view showing a light ink conversion table which is used during the conceivable image recording processes of FIG. 1.
FIG. 2(b) is a schematic view showing a normal ink conversion table which is used during the conceivable image recording processes of FIG. 1.
Figure 3:
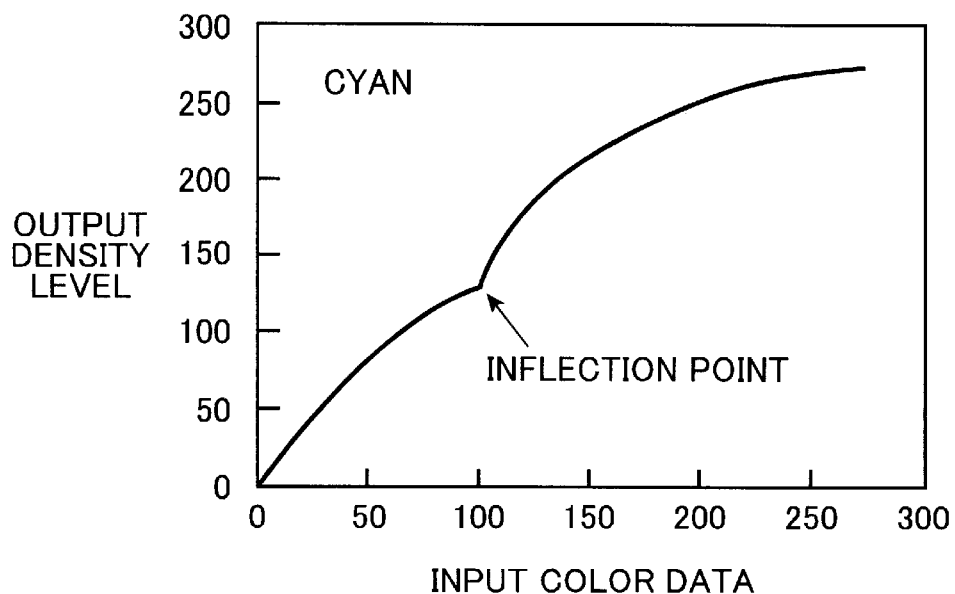
FIG. 3 is a graph showing one example of relationship between input color data and an output density level obtained by the conceivable image recording process that expresses a particular basic color using two inks that are different densities of the same color.
Figure 4:
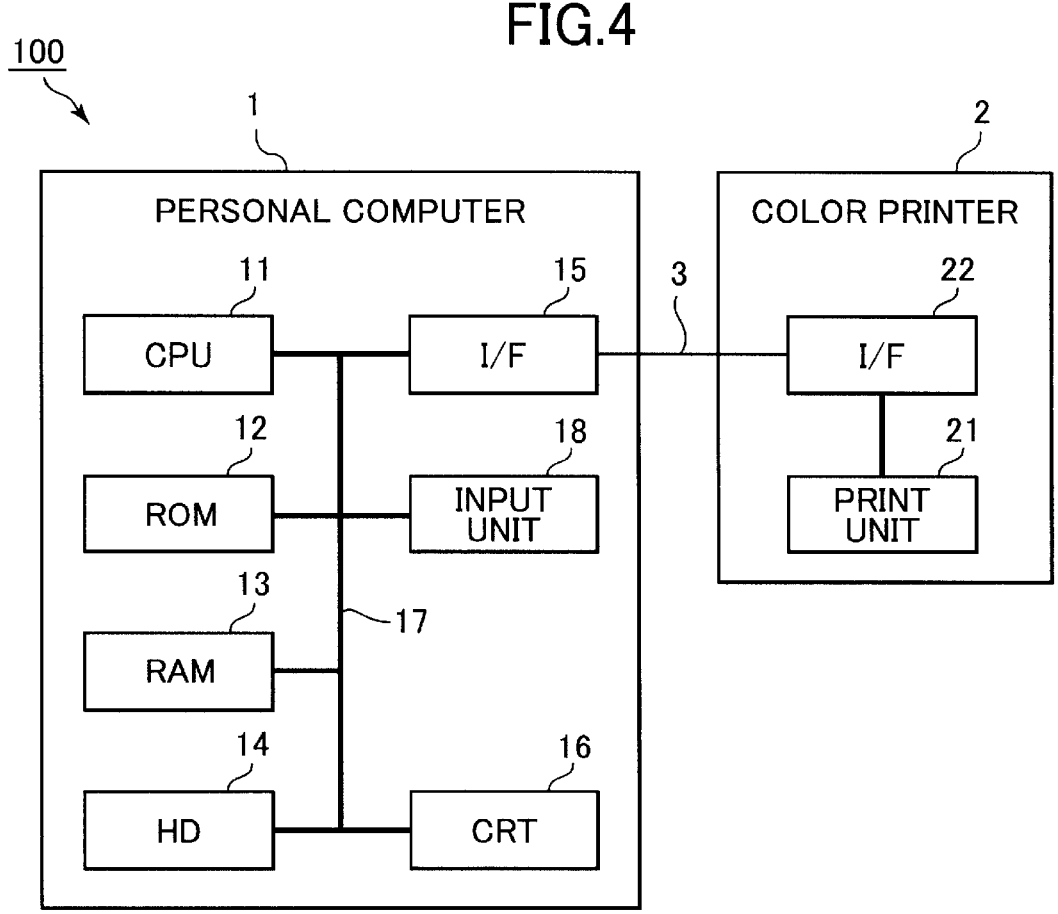
FIG. 4 is a block diagram showing an image recording system that executes an image recording method according to is an embodiment of the present invention.

As shown in FIG. 4, an image recording system 100 of the present embodiment includes a personal computer 1 and a color printer 2. The personal computer 1 and the color printer 2 are connected by a dedicated interface cable 3 for data transmission.

The personal computer 1 includes a central processing unit (CPU) 11, a read-only memory (ROM) 12, a random access memory (RAM) 13, a hard disk 14, a printer interface (I/F) 15, a cathode-ray tube (CRT) display 16, and an input unit 18, all connected together by a bus 17 for data transmission.

The CPU 11 is for executing various control operations and calculation operations according to various programs stored in the ROM 12 and according to other various programs retrieved from the hard disk 14 and stored in the RAM 13. The ROM 12 stores the various control programs, and also various types of data.

The RAM 13 is capable of storing the various programs retrieved from the hard disk 14, and also various data obtained from calculations performed by the CPU 11.

The hard disk 14 serves as an auxiliary storage unit for storing, as files, data and programs which are not stored in main memories such as the ROM 12 or the RAM 13. The hard disk 14 stores an image recording process program for executing an image recording process of the present embodiment. Thus, the hard disk 14 serves as a data storage medium storing data of a program of the image recording process. The hard disk 14 also stores a variety of profiles, such as color correction tables T1 (FIG. 6), tone correction tables T2 (FIG. 7), and conversion tables T3 (light ink conversion tables T3l (FIG. 9(a)) and normal ink conversion tables T3n (FIG. 9(b))). These tables T1, T2, and T3 are used during the image recording process as will be described later.

The input unit 18 includes a mouse and a key board, with which a user can input his/her instruction into the personal computer 1.

The printer interface 15 is for performing two-way data transmission between the computer 1 and the color printer 2 according to a specific transmission protocol agreed upon by the computer 1 and the color printer 2. The CRT 16 is for displaying various types of data in a form visually recognizable by the user of the system 100.

The color printer 2 includes an ink-jet type print unit 21 and a PC interface 22. The print unit 21 is capable of performing data transmission with the personal computer 1 through the PC interface 22 and the printer interface 15.

With the above-described structure, the image recording system 100 of the present embodiment performs an image recording process. The image recording process will be described below briefly with reference to FIG. 5(a).

When input color data (Ci, Mi, Yi, Ki) is prepared by an image preparation application or the like, the input image data (Ci, Mi, Yi, Ki) is color-corrected in S1 into color-corrected color data (Ci', Mi', Yi', Ki'). Then, the color-corrected color data (Ci', Mi', Yi', Ki') is tone-corrected in S2 into color-and-tone-corrected color data (Ci", Mi", Yi", Ki"). Then, in S3, the cyan color component Ci" of the color-and-tone-corrected color data (Ci", Mi", Yi", Ki") is converted into light cyan ink data Cl and normal cyan ink data Cn. Also in S3, the magenta color component M" of the color-and-tone-corrected color data (Ci", Mi", Yi", Ki") is converted into light magenta ink data Ml and normal magenta ink data Mn. Then, in S4, the light cyan ink data Cl, normal cyan ink data Cn, light magenta ink data Ml, normal magenta ink data Mn, color-and-tone-corrected yellow data Yi" and color-and-tone-corrected black data Ki" are binarized into binarized color data (Clo, Cno, Mlo, Mno, Yo, Ko) in a well-known manner, such as described in U.S. Pat. No. 5,045,952. Then, the binarized color data (Clo, Cno, Mlo, Mno, Yo, Ko) is outputted to the printer 2, where a desired color image is printed in S5 based on the binarized color data (Clo, Cno, Mlo, Mno, Yo, Ko).

The print unit 21 is of a type that forms images on a recording medium by ejecting six basic color inks of light cyan (Cl), normal cyan (Cn), light magenta (Ml), normal magenta (Mn), yellow (Y), and black (K) based on the binary color data (Clo, Cno, Mlo, Mn, Yo, Ko) received from the personal computer 1. The print unit 21 is configured to record multi-tons color images, having density levels of 256 tones for each of four colors of cyan, magenta, yellow, and black, by selectively ejecting dots of the six basic color inks according to the received binary color data (Clo, Cno, Mlo, Mno, Yo, Ko). For example, when color data Cl has a tone level of "1" among 256 tone levels and when the color data Cl is converted in S4 into binary color data Clo, the recording unit 21 will eject ink dots of light cyan ink at a dot recording density of 1% when receiving the binary color data Clo.

It is noted that printers of various models can be used as the printer 2. For example, "Epson PM7000" (trade name) manufactured by Seiko Epson Corporation, "Epson MC7000" (trade name) manufactured also by Seiko Epson corporation, and "Hewlett-Packard DJ 5000" (trade name) manufactured by Hewlett-Packard Company can be used as the printer 2. The printer 2 can be used to record images at various resolutions of: 360 dpi (dot per inch), 720 dpi, and 1,440 dpi. The printer 2 can be used with various types of ink, including: dye (normal), ultraviolet ink, "Hexachrome" (trade name) manufactured by Pantone Corporation, "Photo Ink" (trade name) manufactured by Seiko Epson Corporation, and Hi-Fi Color (CMYK+orange/green). The printer 2 can record images on various types of recording medium, such as coated paper, calendered paper, film, OHP sheet, normal paper, and cloth. The printer 2 can be used to record images at various recording speeds, including: a one-way printing speed and a two-way printing speed. The one-way printing speed is a printing speed, at which printing is achieved by a print head moving in one direction only. The two-way printing speed is a printing speed, at which printing is achieved by a print head moving in both of two opposite directions.

A plurality of different sets of printer characteristics are defined so that each set of printer characteristics is defined by one of a plurality of possible combinations of the printer model, the resolution, the type of ink used, the type of recording medium, and the recording speed.

Figure 5A:
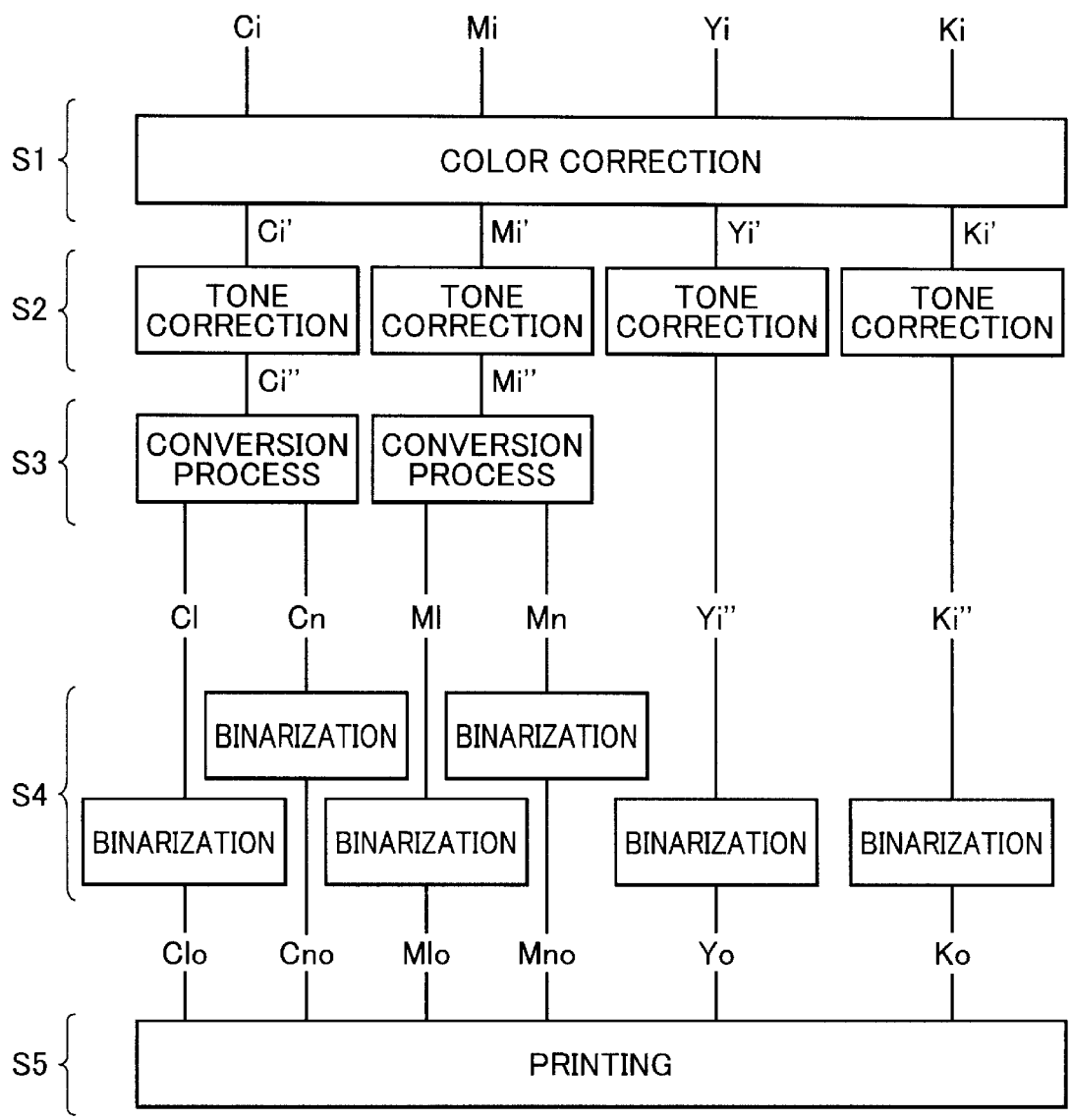
FIG. 5(a) is a schematic flow diagram briefly showing an image recording process performed by the system of the present embodiment.

A plurality of color correction tables T1 are prepared in advance in one to one correspondence with the plurality of sets of printer characteristics. The plurality of color correction tables T1 are stored in the hard disk 14. Although not shown in the drawing, when the image recording process of FIG. 5(a) is started, a user selects one set of printer characteristics, at which he/she desires to perform the subject image recording process. In the color-correction process of S1, therefore, one optimum color correction table T1 is selected from all the color correction tables T1 in accordance with the user's selected set of printer characteristics, and is used for the color-correction process of S1.

Figure 6:
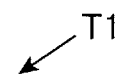
FIG. 6 is a schematic view showing a color correction table used during the image recording processes.

A color correction table T1, for each set of printer characteristics, is a look up table used to correct, in S1, input color data (Ci, Mi, Yi, Ki) in order to reproduce colors faithfully by taking into account how respective colors of cyan, magenta, yellow, and black influence one another. As shown in FIG. 6, the color correction table T1 includes a plurality of sets of color data (C, M, Y, K), which are possibly inputtable to the color-correction process of S1. The color correction table T1 includes, in correspondence with each set of color data (C, M, Y, K) a set of color-corrected color data (C', M', Y', K'), which should be outputted from the color-correction process of S1 in response to the input of the subject set of color data (C, M, Y, K).

More specifically, the color correction table T1 includes 6,561 (=$9^4$) sets of color data (C, M, Y, K), wherein C=0, 32, 64, 96, 128, 160, 192, 224, and 255, M=0, 32, 64, 96, 128, 160, 192, 224, and 255, Y=0, 32, 64, 96, 128, 160, 192, 224, and 255, and K=0, 32, 64, 96, 128, 160, 192, 224, and 255. In association with each set of color data (C, M, Y, K), the table T1 includes one set of color-corrected color data (C', M', Y', K') that should be outputted from the process of S1 to reproduce the corresponding color data (C, M, Y, K). Thus, the color correction table T1 is configured as a four-dimensional look up table, in which 6,561 sets of color-correction data (C', M', Y', K') are stored in one to one correspondence with the 6,561 sets of color data (C, M, Y, K).

It is noted that the color correction table T1 does not store color-corrected color data (C', M', Y', K') for all of the $256^4$ sets of color data (C, M, Y, K), which have all the 256 tone values of 0, 1, 2, . . . , 254, and 255 for each color component. However, the color correction table T1 stores color-corrected color data (C', M', Y', K') only for the $9^4$ sets of color data (C, M, Y, K), which have only nine tone values of 0, 32, 64, 96. 128. 160, 192, 224, and 255 for each color component. Accordingly, during the image recording process (FIG. 5(a)), if input color data (Ci, Mi, Yi, Ki) matches with some set of color data (C, M, Y, K) in the color correction table T1, the input color data (Ci, Mi, Yi, Ki) will be directly color-corrected into color-corrected color data (Ci', Mi', Yi', Ki') that is stored in the color correction table T1 in correspondence with the matching color data (C, M, Y, K). On the other hand, if the input color data (Ci, Mi, Yi, Ki) matches with no color data (C, M, Y, K) in the color correction table T1, then approximate color-correction data (Ci', Mi', Yi', Ki') is calculated by interpolating several sets of color-correction data (C', M', X', K'), which are stored in the table T1 for several sets of color data (C, M, Y, K) that surround the subject set of input color data (Ci, Mi, Yi, Ki).

A plurality of sets of tone correction tables T2 are prepared in advance in one to one correspondence with the plurality of sets of printer characteristics. The plurality of tone correction tables T2 are stored in the hard disk 14. A set of tone correction tables T2, for each set of printer characteristics, has four tone correction tables T2, each being for one of the four basic colors of cyan (C), magenta (M), yellow (Y), and black (K). During the image recording process (FIG. 5(a)), in the tone correction process of S2, one set of optimum tone correction tables T2 is selected from all the sets of tone correction tables T2 in accordance with the set of printer characteristics selected by the user, and is used for the tone correction process of S2.

A tone correction table T2, for each color component, is used to correct, in S2, the tone A' (=Ci', Mi', Yi', or Ki') of the corresponding color component in the input color data (Cl', Mi', Yi', Ki'), which has already been color-corrected in S1, into a color-and-tone-corrected value Ai", (=Ci", Mi", Yi" or Ki") so that processes of S2 through S5 will attain a linear "tone characteristic". It is noted that the "tone characteristic" is defined as the density level of an image, to be actually outputted on the recording medium in S5, with respect to the color-corrected tone value A' (=Ci', Mi', Yi', or Ki'). The output density is determined by actually measuring the output image using a calorimeter or the like.

Figure 7:
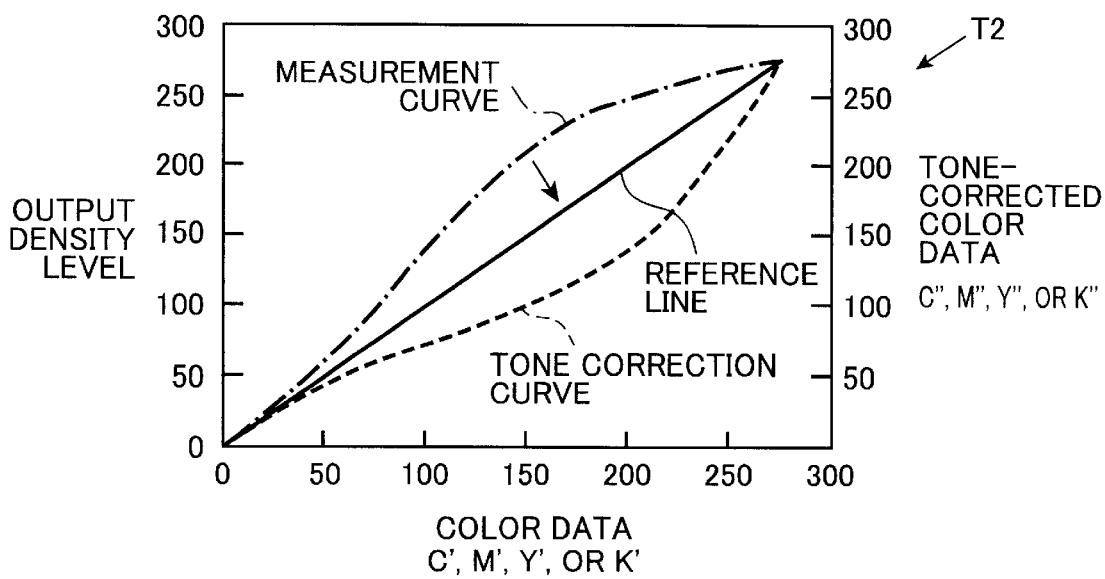
FIG. 7 is a graph representing a measurement curve, indicative of a relationship between color data and an output density level, which is obtained during a process for preparing a tone correction table, and a tone-correction curve, indicative of a relationship between color data and color-corrected data, which is represented by the prepared tone correction table.

It is assumed that when a cyan color component Ci' of color-corrected color data (Ci', Mi', Yi', Ki') from S1 is subjected to the processes of S2–S5, an output density level is obtained in S5 as indicated by a one-dot-and-one-chain line in FIG. 7. In this case, a tone correction table T2 for cyan color component should be prepared to produce an input/output characteristic correction curve, as indicated by a broken line in the figure, to correct for the cyan tone Ci' of the color-corrected color data and to attain a linear input/output characteristic, as indicated by a solid, straight line in the figure.

Thus, a tone correction table T2 for each color component A (=C, M, Y, or K) includes a plurality of sets of color-corrected data A' (=C', M', Y', or K'), which are outputtable from the color-correction process of S1 and therefore inputtable to the tone-correction process of S2. The tone correction table T2 includes, in correspondence with each set of color-corrected data A' (=C', M', Y', or K'), a set of color-and-tone corrected data A" (=C", M", Y", or K"), which should be outputted from the tone-correction process of S2 in response to the input of the subject set of color-corrected data A' (=C', M', Y', or K').

A plurality of groups of conversion tables T3 are prepared in advance also in one to one correspondence with the plurality of sets of printer characteristics. The plurality of groups of conversion tables T3 are stored also in the hard disk 14. One group of conversion tables T3, for each set of printer characteristics, includes two sets of conversion tables T3, each set being for one of cyan (C) and magenta (M). A set of conversion tables T3, for each of cyan and magenta, includes two conversion tables: a light ink conversion table T3l and a normal ink conversion table T3n. During the image recording process (FIG. 5(a)), in the conversion process of S3, one optimum group of conversion tables T3 is selected from all the groups of conversion tables T3 in accordance with the set of printer characteristics selected by the user, and is used for the conversion process of S3.

The conversion tables T3 are prepared only for those basic colors that are expressed using both of light ink and normal ink. Because each color of cyan and magenta is expressed using light ink and normal ink in this embodiment, the conversion tables T3 are prepared only for those two colors of cyan and magenta. The conversion tables T3 (T3l and T3n) for each of cyan and magenta color components are used to divide, in S3, color data A1" (=Ci" or Mi"), which has already been color-corrected in S1 and tone-corrected in S2, into light ink data Al (=Cl or Ml) and normal ink data An (=Cn or Mn) in a conversion characteristic shown in FIG. 8. The light ink conversion table T3l and the normal ink conversion table T3n are prepared as shown in FIGS. 9(a) and 9(b), respectively, for each of cyan and magenta colors, to represent the conversion characteristic of FIG. 8.

Thus, conversion tables T3n and T3l for each color component A (=C or M) includes a plurality of sets of color-and-tone-corrected data A" (=C" or M"), which are outputtable from the tone-correction process of S2 and therefore inputtable to the conversion process of S3. The light ink conversion table T3l includes, in correspondence with each set of color-and-tone-corrected data A" (=C" or M"), a set of light ink data Al (=Cl or Ml), which should be outputted from the conversion process of S3 in response to the input of the subject set of color-and-tone-corrected data A" (=C" or M"). The normal ink conversion table T3n includes, in correspondence with each set of color-and-tone-corrected data A" (=C" or M"), a set of normal ink data An (=Cn or Mn), which should be outputted from the conversion process of S3 in response to the input of the subject set of color-and-tone-corrected data A" (=C" or M").

Figure 8:
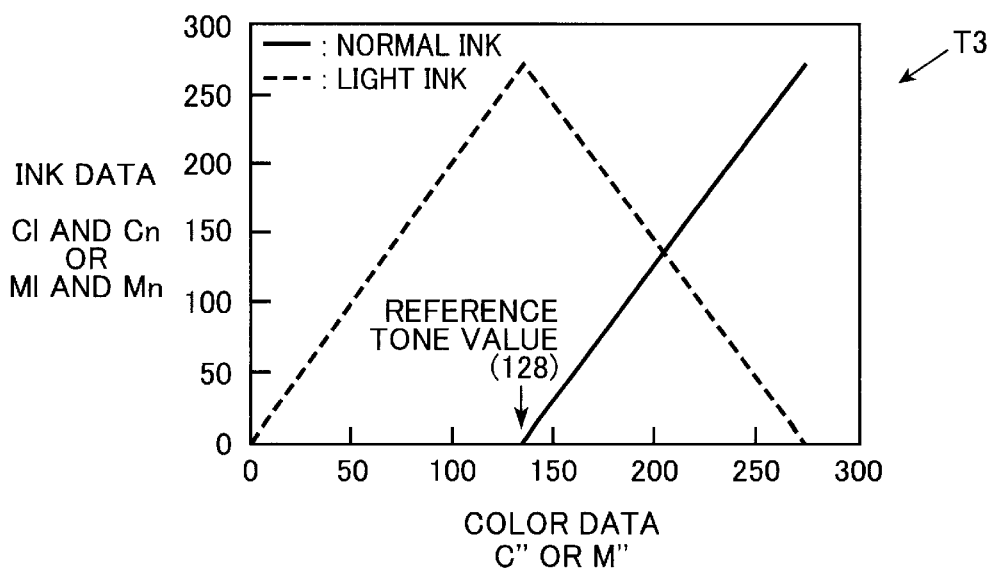
FIG. 8 is a graph representing a relationship between color data, for each of two basic colors of magenta or cyan, and corresponding light ink data and normal ink data.

It is noted that according to the conversion characteristic of FIG. 8, in order to reproduce each of cyan and magenta colors, when the tone value of the color-and-tone-corrected data A" (=C" or M") is smaller than a predetermined reference tone value (128, for example), only light ink is used to reproduce the tone by changing the dot recording density of light ink. Normal ink starts being used when the tone value of the color-and-tone-corrected data A" (=C" or M") reaches the reference tone value (128). Once the reference tone value is reached, the tone is reproduced by gradually (linearly) reducing the dot recording density of light ink while gradually (linearly) increasing the dot recording density of normal ink in association with increase in the tone value of the color-and-tone-corrected data A" (=C" or M").

The reference tone value is defined as the tone value when normal ink starts being used. The reference tone value is determined in a comprehensive manner, taking into account the allowable tone values for light ink where "roughness" of dots of normal ink do not appear noticeable and where light ink "bleeding (blurring)" is not induced. The frequency of occurrence in "roughness" and the frequency of occurrence in "bleeding" can change with color, "quality," absorbency, and the like of the recording medium, and also with a ratio between densities of the normal ink and of the light ink. Therefore, the plurality of groups of conversion tables T3 are prepared to match the plurality of sets of printer characteristics, including the printer model, resolution, the type of ink used, the type of recording medium, and the printing speed.

Next will be described how to prepare the color correction tables T1, the tone correction tables T2, and the conversion tables T3 (T3n and T3l).

For each set of printer characteristics, the conversion tables T3 (T3n and T3l), the tone correction tables T2, and the color correction tables T1 are prepared in this order. That is, the printer 2 is set with one set of printer characteristics, and the tables T3, T2, and T1 are produced in this order. Then, the printer 2 is reset with another set of printer characteristics, and the tables T3, T2, and T1 are produced again in this order. Thus, the tables T3, T2, and T1 are repeatedly produced while changing the printer characteristics.

First will be described how to prepare the conversion tables T3 (T3n and T3l) for cyan color. It is noted that the conversion tables T3 (T3n and T3l) are prepared for magenta color in the same manner as described below for cyan color.

First, the reference tone value is set to a desirable value ("128," in this example). The reference tone value is defined as the tone level point C", from which normal ink will be used.

Next, the value of normal ink data Cn for the reference tons value C" of 128 is determined as a desirable value ("1," for example). This value indicates the amount of normal ink that should be ejected, together with light ink, to reproduce the reference tone value C" of 128. It is noted that when the normal ink data Cn having the value of "1" is converted into binary data Cno in S4 and supplied to the color printer 2, the print unit 21 will eject the normal ink at a dot recording density of 1%.

Then, the value of light ink data Cl for the reference tone value C" of 128 is determined in a trial-and-error manner described below. It is noted that this value indicates the amount of light ink that should be ejected, together with normal ink, to reproduce the reference tone value C" of 128.

First, the print unit 21 is controlled to produce a plurality of single-color color patches by ejecting light ink on a recording medium based on a plurality of tone levels that differ from one another in stepwise increments. For example, nine single-color color patches are produced for nine tone levels of 0, 32, 64, 96, 128, 160, 192, 224, and 255 as shown in FIG. 10. More specifically, nine sets of light ink data Cl of 0, 32, 64, 96, 128, 160, 192, 224, and 255 are prepared, binarized in the same manner as in the process of S4, and supplied to the printer 2. As a result, the plurality of single-color color patches are produced by light cyan ink in stepwisely-increasing dot recording densities.

Then, the print unit 21 is controlled to eject normal ink, onto each single-color color patch, based on the tone level ("1" in this example) that is already determined for the reference tone level C" of 128. More specifically, one set of normal ink data Cn of 1 is prepared, binarized in the same manner as in the process of S4, and supplied to the printer 2. As a result, each single-color color patch is further printed with normal ink at a dot recording density (1% in this example) that corresponds to the tone level of "1".

Then, the plurality of single-color color patches are visually observed by an operator to select one or more allowable color patches where normal ink dot "roughness" appear unnoticeable. Then, one color patch is selected that has been printed with the lowest tone level of light ink among the selected one or more allowable color patches. The tone level of the thus selected one color patch is determined as the lowest allowable light ink amount for the reference tone level C" of 128.

The print unit 21 is further controlled to produce a plurality of mixed-color color patches by ejecting four inks of: light cyan ink, light magenta ink, yellow ink, and black ink, at a plurality of tone levels that are different from one another in stepwise increments. Each color patch is produced according to the same tone level for all of the four inks. For example, nine mixed-color color patches are produced at nine tone levels of 0, 32, 64, 96, 128, 160, 192, 224, and 255 for each of four colors as shown in FIGS. 10. More specifically, nine sets of color data (Cl, Ml, Y", K"), each set of color data having the same tone values of 0, 32, 64, 96, 128, 160, 192, 224, and 255 for all the color components, are prepared, binarized in the same manner as in the process of S4, and supplied to the printer 2. As a result, nine mixed-color color patches are produced by all the four inks in stepwisely-increasing dot recording densities.

Then, the plurality of mixed-color color patches are visually observed by the operator to select one or more allowable color patches where no bleeding or blurring appear in cyan or magenta light ink. One color patch is then selected that has printed with the highest tone level among the selected one or more allowable color patches. The tone level of the thus selected one color patch is determined as the highest allowable light ink amount for the reference tone level C" of 128.

When the thus determined highest allowable light ink amount is equal to the determined lowest allowable light ink amount, the highest or lowest allowable light ink amount is determined as light ink tone data Cl that should be outputted in S3 for the reference tone level C" of 128. Accordingly, the highest or lowest allowable light ink amount is determined as light ink data Cl for the reference tone C" of 128. In this example, as shown in FIGS. 8 and 9(a), light ink data Cl is determined as "255" with respect to the reference tone value C" of 128.

On the other hand, when the determined highest and lowest allowable light ink amounts are not equal to each other, observations of the single-color color patches and of the mixed-color color patches are performed again to reselect allowable color patches in a lower precision so that the lowest and highest allowable light ink amounts will become equal to each other.

Next, the value of light ink data Cl is determined for all the remaining tone values C" of 0–127 and 129–255.

First, the value of light ink data Cl is determined as "0" for color data C" of the minimum and maximum tone values of 0 and 255. Then, as shown in FIG. 8, a graph is prepared in which the horizontal axis denotes color data C' in the range of 0 to 255, and the vertical axis denotes light ink data and normal ink data both in the range of 0 to 255. Then, as indicated by a broken line in FIG. 8, a linearly increasing-and-then-decreasing line is prepared to connect the light ink minimum-tone point (0, 0) to the light ink reference-tone point (128, 255) and further to the light ink maximum-tone point (255, 0). Along this linearly increasing-and-decreasing line, the value of light ink data Cl, defined along the vertical axis, is determined for all of the 256 color data C" of 0, 1, . . . , 255 defined along the horizontal axis. As a result, light ink data Cl is determined as shown in FIG. 9(a) with respect to all of the tone values of 0–255 of color data C".

Next, the value of normal ink data is determined for all of the remaining tone values of 0–127 and 129–255 of color data C'' in a trial-and-error manner described below. It is noted that the value of normal ink data Cn is already determined as "1" for the reference tone value C'' of 128.

First, the value of normal ink data Cn is determined as "0" for all the tone values C'' of 0–127 that are smaller than the reference tone value 128.

Then, the value of normal ink data is determined for the maximum tone value C'' of 255 in a manner described below.

First, the print unit 21 is controlled to produce a plurality of single-color color patches by ejecting normal ink on a recording medium based on a plurality of tone levels that differ from one another in stepwise increments. For example, nine single-color color patches are produced by normal ink for nine tone levels of 0, 32, 64, 96, 128, 160, 192, 224, and 255 as shown in FIG. 10. More specifically, nine sets of normal ink data Cn of 0, 32, 64, 96, 128, 160, 192, 224, and 255 are prepared, binarized in the some manner as in the process of S4, and supplied to the printer 2. As a result, nine single-color color patches are produced by normal ink in stepwisely-increasing dot recording densities.

Then, the print unit 21 is controlled to eject light ink, onto each single-color color patch, based on the tone level of light ink that is already determined for the maximum tone level C'' of 255. In this example the tone level is already determined as "0" for the maximum tone level C'' of 255. Accordingly, each color patch is further printed with no light ink.

Then, the plurality of single-color color patches are visually observed by the operator to select one or more allowable color patches where no undesirable white regions appear noticeable. One color patch is then selected that has printed with the lowest tone level of normal ink among the selected one or more allowable color patches. The tone level of this color patch is determined as the lowest allowable normal ink amount for the maximum tone level C'' of 255.

Next, the print unit 21 is controlled to produce a plurality of mixed-color color patches by ejecting four inks of: normal cyan ink, normal magenta ink, yellow ink, and black ink, at a plurality of tone levels that are different from one another in stepwise increments. Each color patch is produced according to the same tone level for all of the four inks. For example, nine mixed-color color patches are produced at nine tone levels of 0, 32, 64, 96, 128, 160, 192, 224, and 255 for each of the four inks as shown in FIG. 10. More specifically, nine sets of color data (Cn, Mn, Y'', K''), each set of color data having the same tone values of 0, 32, 64, 96, 128, 160, 192, 224, and 255 for all the color components, are prepared, binarized in the same manner as in the process of S4, and supplied to the printer 2. As a result, nine mixed-color color patches are produced by the four inks in stepwisely-increasing dot recording densities.

Then, the plurality of mixed-color color patches are visually observed by the operator to select one or more allowable color patches where no bleeding or blurring appear in the cyan or magenta normal ink. One color patch is then selected that has printed with the highest tone level among the selected one or more allowable color patches. The tone level of the thus selected one color patch is determined as the highest allowable normal ink amount for the maximum tone level C'' of 255.

When the thus determined highest allowable normal ink amount is equal to the determined lowest allowable normal ink amount, the highest or lowest allowable normal ink amount is determined as normal ink tone data Cn that should be outputted from S3 for the maximum tone level C2 of 255. Accordingly, the highest or lowest allowable normal ink amount is determined as normal ink data Cn for the maximum tone C'' of 255. In this example, as shown in FIGS. 8 and 9(b), normal ink data Cn is determined as "255" with respect to the maximum tone value C'' of 255.

On the other hand, when the determined highest and lowest allowable normal ink amounts are not equal to each other, observations of the single-color color patches and of the mixed-color color patches are performed again to reselect allowable color patches in a lower precision so that the lowest and highest allowable normal ink amounts will become equal to each other.

Next, the value of normal ink data Cn is determined for all the remaining tone values C'' of 129–254.

As indicated by a solid line in FIG. 8, a linearly increasing line is produced to connect the normal ink reference-tone point (128, 1) to the normal ink maximum-tone point (255, 255). Along this linearly-increasing line, the value of normal ink data Cn, defined along the vertical axis, is determined for all of the values of color data C'' of 129, 130, . . . 253, and 254, defined along the horizontal axis. Thus, the value of normal ink data Cn with respect to all the tone values C'' of 128–255 is determined and stored as shown in FIG. 9(b).

Next will be described how to prepare the tone correction table T2 for cyan color. It is noted that the tone correction table T2 is prepared for magenta color in the same manner as described below for cyan color.

First, nine sets of color data C' of 0, 32, 64, 96, 128, 160, 192, 224, and 255, which will be possibly inputted into the tone-correction process of S2, are prepared. Each set of color data C' is subjected to no tone-correction process of S3. As a result, nine sets of color data C'' having the some tone values 0, 32, 64, 96, 128, 160, 192, 224, and 255 are obtained. Then, the nine sets of color data C'' are subjected to the conversion process of S3. As a result, each set of color data C'' is converted into normal ink data Cn and light ink data Cl by using the conversion tables T3n and T3l, which are already produced in the manner described above. Thus, nine sets of color data C' are directly converted into nine sets of ink data (Cn, Cl).

Then, the print unit 21 is controlled by the nine sets of ink data (Cn, Cl) to print nine single-color color patches on a recording medium using both light and normal inks. That is, each set of ink data (Cn, Cl) is binarized in the same manner as in the process of S4, and supplied to the printer 2. As a result, nine color patches are produced as shown in FIG. 10. Then, the output density level of each color patch is measured using a colorimeter or the like.

A graph of FIG. 7 is then prepared, in which the horizontal axis indicates color data C' in the range of 0–255, a left-hand vertical axis indicates the measured density levels in the range of 0–255, and a right-hand vertical axis indicates tone-corrected levels C'' of 0–255 to be obtained. Based on the measurement results of the nine color patches, a measurement curve is prepared, as indicated by a one-dot-and-one-chain line in the figure, to represent the relationship between the color data C' (horizontal axis) and the measured density values (left-hand vertical axis). A predetermined reference line is then plotted in the same graph to connect the minimum tone point (0, 0) and the maximum tone point (255, 255) as indicated by a solid line in the figure. Then, as indicated by a broken line in the same figure, a tone-correction curve is calculated as a curve that is symmetrical to the measurement curve with respect to the reference line. The tone-correction curve is then set as a tone-correction table T2. That is, along the tone-correction curve, the value of tone-corrected data C", defined along the right-hand vertical axis, is determined for all of the 256 values of color data C' of 0–255, defined along the horizontal axis.

It is noted that the measurement results of the color patches show that when color data C' is subjected to the color reproducing characteristic of S3–S5, represented by the measurement curve (one-dot-and-one-chain line in FIG. 7), the color data C' is converted into the output density level plotted on the measurement curve. The tone-correction curve (broken line in FIG. 7) is therefore determined so that when any color data C' is actually inputted, the color data C' will be subjected first to the tone correction characteristic of S2, represented by the tone-correction curve, and then to the color reproducing characteristic of S3–S5, represented by the measurement curve, resulting in the output density levels on the linear reference line. Accordingly, actually-inputted color data C' will be converted through S2–S5 to the output density levels with a linear conversion characteristic, which is a combination of the tone correction characteristic of S2, represented by the tone-correction curve (broken line in FIG. 7), and the color reproducing characteristic of S3–S5, represented by the measurement curve (one-dot-and-one-chain line in FIG. 7).

It is also noted that when preparing color patches in order to prepare the tone correction table T2, it is desirable to produce 256 color patches based on all of the 256 different tones from 0 to 255 of color data C'. However, when only nine color patches are produced at tone values "0", "32", . . . , and "255" that are separated from one another by the fixed tone value of "32", then it is preferable to produce one of the nine color patches based on the reference tone value C' of 128 as shown in FIG. 10. When expressing a single basic color using normal ink and light ink, a point of inflection tends to be generated in the output density level at the point of the reference tone value where normal ink starts being used. Therefore, it is preferable to take into consideration the output density level at the reference tone point in order to perform tone correction with high precision.

Next will be described how to prepare the tone correction table T2 for yellow color. It is noted that the tone correction table T2 is prepared for black color in the same manner as described below for yellow color.

The print unit 21 is first controlled according to nine sets of color data Y' of 0, 32, 64, 96, 128, 160, 192, 224, and 255 to produce nine color patches. More specifically, nine sets of yellow color data Y' of 0, 32, 64, 96, 128, 160, 192, 224, and 255 are prepared, binarized in the same manner as in the process of S4, and are supplied to the printer 2. As a result, nine color patches are produced by yellow ink as shown in FIG. 10. Densities of the nine color patches are measured by the colorimeter. Because a measurement curve (one-dot-and-one-chain line) of FIG. 7 is produced based on the measurement results similarly as described above for cyan ink, a predetermined reference line (solid line) and a tone-correction curve (broken line) are determined also in the same manner as described above. The thus obtained tone-correction curve (broken line) is set as the tone-correction table T2 for the yellow color.

Next will be described how to prepare the color-correction table T1.

First, 6,561 (=$9^4$) sets of color data (C', M', Y', K'), which will possibly be outputted from the color-correction process of S1, are prepared, wherein C=0, 32, 64, 96, 128, 160, 192, 224, and 255, M=0, 32, 64, 96, 128, 160, 192, 224, and 255, Y=0, 32, 64, 96, 128, 160, 192, 224, and 255, and K=0, 32, 64, 96, 128, 160, 192, 224, and 255. The yellow component Y' of each set of color data (C', M', Y', K') is tone-corrected into tone-corrected data Y" in the same manner as in the process of S2 using the tone-correction table T2 already prepared for yellow color in the manner described above. Similarly, the black component K' of each set of color data (C', M', Y', K') is tone-corrected into tone-corrected data K' in the same manner as in the process of S2 using the tone-correction table T2 already prepared for black color. The cyan component C' of each set of color data (C', M', Y', K') is tone-corrected into tone-corrected data C" in the same manner as in the process of S2 using the tone-correction table T2 already prepared for cyan color, and are further converted in the same manner as in the process of S3 into light ink data Cl and normal ink data Cn using the conversion tables T3l and T3n already prepared for cyan color. Similarly, the magenta component M' of each set of color data (C', M', Y', K') is tone-corrected into tone-corrected data M" in the same manner as in the process of S2 using the tone-correction table T2 already prepared for magenta color, and are further converted in the same manner as in the process of S3 into light ink data Ml and normal ink data Mn using the conversion tables T3l and T3n already prepared for magenta color. Thus, each set of color data (C', M', Y', K') is converted into a set of color data (Cl, Cn, Ml, Mn, Y", K"). The set of color data (Cl, Cn, Ml, Mn, Y", K") is then binarized into binarized data (Clo, Cno, Mlo, Mno, Yo, Ko) in the same manner as in the process of S4, and is supplied to the printer 2. As a result, the print unit 21 is controlled to produce 6,561 color patches. The color patches are measured using the calorimeter in order to determine L*a*b* color values (L, a, b), defined in the L*a*b* colorimetric system (CIE 1976), for all the sets of original color data (C', M', Y', K'). Interpolation calculation is performed on the measured L*a*b* color values and the original color values (C', M', Y', K') to determine a relationship between a plurality of Lab color values (L, a, b) and a plurality of color values (C', M', Y', K'), which are to be outputted from the color-correction process of S1.

Next, the relationship between color values (C, M, Y, K), which are to be inputted to the color correction process of S1, and L*a*b* color values (L, a, b) is determined. More specifically, 6,561 sets of color data (C, M, Y, K), which will possibly be inputted to the color correction process of S1, are prepared, wherein C=0, 32, 64, 96, 128, 160, 192, 224, and 255, M=0, 32, 64, 96, 128, 160, 192, 224, and 255, Y=0, 32, 64, 96, 128, 160, 192, 224, and 255, and K=0, 32, 64, 96, 128, 160, 192, 224, and 255. Each set of color data (C, M, Y, K) is outputted, without being subjected to any correction or conversion process, to a standard printer to produce 6,561 color patches. The color patches are measured by the colorimeter to obtain the L*a*b color values (L, a, b) of the color patches. Interpolation calculation is performed on the measured L*a*b* color values and the original color values (C, M, Y, K) to determine a relationship between a plurality of color values (C, M, Y, K), which are to be inputted to the color-correction process of S1, and a plurality of Lab color values (L, a, b). It is noted that the relationship between color data (C, M, Y, K) and the L*a*b color values (L, a, b) can be determined also based on a (CMYK-Lab) look up table that is supplied from Pantone Corporation or SWOP (Standard Wet Offset Printing). As a result, the relationship among color data (C, M, Y, K), to be inputted to the process of S1, L*a*b* color data (L, a,. b), and color-corrected color data (C', M', Y', K'), to be outputted from the process of S1, is obtained. Therefore, a direct relationship between color data (C, M, Y, K) and color-corrected color data (C', M', Y', K') is obtained. Thus, the color correction table T1 is obtained.

According to the present embodiment, the table T1, the tables T2 for cyan, magenta, yellow, and black, and tables T3 (T3n and T3l) for cyan and magenta are produced in the above-described manner in correspondence with each of all the sets of printer characteristics selectable by a user of the image recording system 100.

The image recording system 100 attains the image recording process of FIG. 5(a) when the personal computer 1 performs an image recording routine, in a manner shown in FIG. 5(b), by executing the image recording process program stored in the hard disk 14.

The personal computer 1 starts an image recording process of FIG. 5(b) when the user of the system 100 inputs, via the input unit 18, his/her instruction to record input color data (Ci, Xi, Yi, Ki), which is prepared using an image preparation application or the like. When the image recording process starts being executed, the CPU first stores the input color data (Ci, Mi, Yi, Ki) into a work area of the RAM 13 in S100.

The CPU 11 then performs in S101 an operation that enables the user to select his/her desired set of printer characteristics, at which the color printer 2 should perform printing operation.

More specifically, the CPU 11 controls in S101 the CRT 16 to display five categories relating to the printer characteristics. These categories are; printer model, ink type, recording medium type, resolution, and print speed. Each category includes a plurality of items prepared in advance. Examples of items for "printer model" include: Epson PM7000, Epson MC7000, and Hewlett-Packard DJ 5000. Examples of items for "resolution" include: 360 dpi (dot per inch), 720 dpi, 1,440 dpi. Examples of items for "ink type" include: dye (normal), ultraviolet ink, "Hexachrome", "Photo Ink", and Hi-Fi Color (CMYK+orange/green). Examples of items for "recording medium type" include: coated paper, calendered paper, film, OHP sheet, normal paper, and cloth. Examples of items for "print speed" include: a one-way printing speed and a two-way printing speed.

Viewing the CRT 16, the user selects one of the items for each category to thereby input his/her selected one set of printing characteristics via the input unit 18.

Next, in S102, in accordance with the set of printer characteristics, that is determined by the combination of items selected by the user, the CPU 11 selects an appropriate color correction table T1 from the plurality of color correction tables T1 in the hard disk 14. The selected color correction table T1 is copied into the RAM 13. Then, in S104, the input color data (Ci, Mi, Yi, Ki) is color-corrected into color-corrected color data (Ci', Mi', Yi', Ki') using the selected color correction table T1. Thus, the color-correction process (S1 in FIG. 5(a)) is attained.

It is noted that if input color data (Ci, Mi, Yi, Ki) is not equal to any color data (C, M, Y, K) listed in the color correction table T1, color-corrected color data (Ci', Mi', Yi', Ki') is calculated by performing a linear interpolation onto several sets of color-corrected color data (C', M', Y', K') that are listed in the table T1 for several sets of color data (C, M, Y, K) that surround the subject input color data (Ci, Mi, Yi, Ki).

As a result, each set of input color data (Ci, Mi, Yi, Ki) is color-corrected into color-corrected color data (Ci', Mi', Yi', Ki') so as to be suitably reproduced by a combination of four colors of cyan, magenta, yellow, and black. The yellow and black color components Yi' and Ki' of the color-corrected color data (Ci', Mi', Yi', Ki') will be subjected to a tone correction process so that an image finally obtained on the image recording medium will properly have linear input/output characteristics with respect to the color values of Yi' and Ki'. Cyan and magenta color components Ci' and Mi' will be subjected to the tone correction process and further to a conversion process so that an image finally obtained on the image recording medium will properly have linear input/output characteristics with respect to the color values of Ci' and Mi'.

More specifically, in S106, in accordance with the set of printer characteristics selected by the user in S101, an appropriate set of tone correction tables T2 is selected from the plurality of sets of color correction tables T2 in the hard disk 14. The selected set of tone correction tables T2 includes tone correction tables T2 for all the colors of cyan, magenta, yellow, and black. The selected set of tone correction tables T2 is copied into the RAM 13.

Then, in S108, using the selected set of tone correction tables T2, values of color data (Ci', Mi', Yi', Ki'), which has already been subjected to the color correction processes of S104, are subjected to tone correction.

During the tone correction process for the cyan component, the value Ci' of the color-corrected input color data (Ci', Mi', Yi', Ki') is used to refer to the horizontal axis in the tone-correction table T2 (FIG. 7) for cyan color. Then, with respect to the color-corrected data Ci' (horizontal axis), the value of tone-corrected color data Ci" (right-band vertical axis) on the tone-correction curve is obtained. Thus, a color-and-tone-corrected color data Ci" is obtained for the color-corrected color data Ci'. The same operation is performed for other remaining values Mi', Yi', and Ki' by using the tone-correction tables T2 (FIG. 7) for magenta, yellow, and black colors. As a result, one set of color-and-tone-corrected color data (Ci", Mi", Yi", Ki") is produced based on each set of color-corrected color data (Ci', Mi', Yi', Ki'). Thus, the tone correction process (S2 in FIG. 5(a)) is attained.

The values Yi" and Ki" of yellow and black color components will be directly converted into binary data Yo and Ko as described later. Contrarily, the value Ci" of cyan color component is further converted into light cyan ink data Cl and normal cyan ink data Cn. The value Mi" of magenta color component is further converted into light magenta ink data Ml and normal magenta ink data Mn.

More specifically, in S110, in accordance with the set of printer characteristics selected by the user in S101, an appropriate group of conversion tables T3 is selected from the plurality of groups of conversion tables T3 in the hard disk 14. The selected conversion table group T3 has: a light ink conversion table T3l and a normal ink conversion table T3n for cyan color, and a light ink conversion table T3l and a normal ink conversion table T3n for magenta color. The selected conversion table group T3 is copied into the RAM 13. Then, in S112, using the selected conversion tables T3l and T3n for cyan color, the value Ci" is converted into values Cl and Cn. Similarly, using the selected conversion tables T3l and T3n for magenta color, the value Mi" is converted into values Ml and Mn.

It is noted that during the conversion process for cyan, the value Ci" is used to refer to the horizontal axis of FIG. 8, which is represented by the conversion tables T3l and T3n (FIGS. 9(a) and 9(b)) for cyan color. Then, with respect to the value of the color-and-tone-corrected data Ci" (horizontal axis), a value Cl of light ink color data (vertical axis) is obtained on the light ink conversion line (broken line) and a value Cn of normal ink color data (vertical axis) is obtained on the normal ink conversion line (solid line). Thus, light ink color data Cl and normal ink color data Cn are produced. In other words, the color-and-tone-corrected color data Ci" is converted into ink data (Cl, Cn). The same operation as described above is performed for magenta color component using the conversion tables T3n and T3l for magenta color. Thus, light cyan ink data Cl, normal cyan ink data Cn, light magenta ink data Ml, and normal magenta ink data Mn are produced. Thus, the conversion process (S3 in FIG. 5($a$)) is attained.

The thus produced ink data Cl, Cn, Ml, and Mn is outputted together with the color data Yi" and Ki" for yellow and black components. Thus, a set of color data (Cl, Cn, Ml, Mn, Yi", Ki") is obtained based on each set of original input color data (Ci, Mi, Yi, Ki).

Then, in S114, the thus obtained color data (Cl, Cn, Ml, Mn, Yi", Ki"), which has been subjected to the several correction and conversion processes as described above, is subjected to a binarization processes in the well known manner such as those described in the U.S. Pat. No. 5,045, 952. Thus, the binarization process (S4 in FIG. 5($a$)) is attained.

Then, a resultant binary signal (Cl$_o$, Cn$_o$, Ml$_o$, Mn$_o$, Y$_o$, K$_o$) is outputted to the color printer 2. The print unit 21 is controlled in S116 to print a color image on the image recording medium based on the binary signal (Cl$_o$, Cn$_o$, Ml$_o$, Mn$_o$, Y$_o$, K$_o$) at the user's selected set of printer characteristics.

As described above, according to the present embodiment, the plurality of groups of conversion tables T3 (T3n and T3l) that match the plurality of sets of printer characteristics are prepared for converting color data Ci" and Mi", in two basic colors of cyan and magenta, into color data Cl and Cn and Ml and Mn for light ink and normal ink. When the user sets his/her desired set of printer characteristics for the present image recording process differently from that used during the previous image recording process, a new group of conversion tables T3 (T3n and T3l) that properly matches the present printer characteristics will be used during the present image recording process. Accordingly, the dot "roughness" of normal ink and the bleeding of light ink will appear unnoticeable on the recorded images. As a result, images can always be recorded under the optimum conditions.

According to the image recording method of the present embodiment, color data Ci' and Mi' for the two basic colors of cyan and magenta is subjected to tone correction in S2 (S108). and then in S3 (S112), the tone-corrected color data Ci" and Mi" is converted into color data Cl and Cn and Ml and Mn for light and normal inks according to the conversion table T3 (T3l and T3n). Accordingly, when an image is recorded based on the converted color data (ink data), the image will reliably be influenced from the tone correction operation, so that the image will have good quality.

Furthermore, according to the embodiment, tone correction is performed according to a tone correction table T2 that has been prepared to adjust color data of the basic colors to have a linear relationship with respect to output density levels. Accordingly, the interpolation precision, at which approximate correction values are calculated in S1 (S104) by the linear interpolation, is improved so that further high quality can be achieved.

The color patches, produced in order to prepare the tone correction tables T2 for the two basic colors of cyan (C) and magenta (M), include a color patch that corresponds to the reference tone value of 128, where a point of inflection tends to occur in the corresponding output density level. Therefore, the tone correction tables T2, prepared based on those color patches, will attain tone adjustment with high precision, so that pseudo contours are not generated in the recorded images.

While the invention has been described in detail with reference to the specific embodiment thereof, it would be apparent to those skilled in the art that various changes and modifications may be made therein without departing from the spirit of the invention, the scope of which is defined by the attached claims.

For example, according to the embodiment, tone correction processes of S2 (S108) and conversion processes of S3 (S112) are performed individually after color correction processes of S1 (S104) are performed. That is, conversion processes of S3 (S112) are performed after the tone correction processes of S2 (S108). However, tone correction processes and conversion processes could be performed simultaneously by merging together the tone correction table T2 and the conversion table T3.

According to the embodiment, each of the two basic colors of cyan (C) and magenta (M) is expressed using light and normal inks of the same color. However, the present invention is not limited to the case when each of the two basic colors is expressed using light and normal inks, but could be applied to the situation where only one of these two basic colors is expressed using light and normal inks of the same color. Or, another basic color can be expressed also using light and normal ink of the same color. For example, black color may be expressed using light and normal ink of the same, black color.

Further, the present invention is not limited to expressing the same color using light and normal inks, that is, using two inks with different densities. The present invention could be applied to the situation where the same color is expressed using inks with three or more different densities.

Also, the embodiment describes automatic selection of a variety of tables T1–T3 based on the printer characteristics selected by the user. However, the system can be modified so that the user can directly select a table T1–T3 desired to be used. That is, in each of S102, S106, and S110, the program can be designed to allow the user to select his/her desired table.

The color correction table T1 may be produced in a manner described in U.S. Pat. No. 4,500,919.

If the tone correction tables T2 and the conversion tables T3 can be prepared to satisfactorily represent the variations in the printer characteristics, a single color correction table T1 may be prepared in correspondence with all the sets of printer characteristics. In this case, the single color correction table T1 will be used for all the sets of printer characteristics. The selection process of S102 is not needed.

In the above-described embodiment, the tone correction table T2 is prepared so as to store a set of tone-corrected color data A" (=C" or M") for each of all the 256 sets of color data A' (=C' or M') of 0 to 255. However, the tone correction table T2 may be prepared to store a set of tone-corrected color data A" (=C" or M") only for several sets of color data A' (=C' or M') which are arranged at a fixed interval of "32," for example. In this case, interpolation calculation is employed during the tone correction process of S2 (S108).

What is claimed is:

1. A method for recording a color image on a recording medium by expressing at least one basic color using a plurality of inks that have different densities of the corresponding color, the method comprising the steps of:
   preparing a plurality of conversion tables, each for converting color data of at least one basic color into converted color data of the plurality of inks that have different densities of the corresponding color, each conversion table matching one of a plurality of sets of printer characteristics;
   selecting a set of printer characteristics, with which printing operation is desired to be performed;
   selecting one conversion table from the plurality of conversion tables in accordance with the selected set of printer characteristics;
   converting, based on the selected conversion table, the color data of each of the least one basic color into converted color data of the plurality of inks that have different densities of the corresponding color; and
   performing printing operation to record a color image on a recording medium based on the converted color data with the selected set of printer characteristics.

2. A method as claimed in claim 1, wherein the printer characteristics selecting step includes the step of allowing a user to select his/her desired set of printer characteristics.

3. A method for recording a color image on a recording medium by expressing at least one basic color using a plurality of inks that have different densities of the corresponding color, the method comprising the steps of:
   receiving color data of at least one basic color;
   converting the color data of each of at least one basic color into converted color data of the plurality of inks that have different densities of the corresponding color, while performing tone correction on the color data of each of the at least one basic color; and
   performing printing operation to record a color image on a recording medium based on the converted color data.

4. A method as claimed in claim 3, wherein after performing the tone correction on the received color data of each of the at least one basic color, the tone-corrected color data of each of the at least one basic color is converted into the converted color data of the plurality of inks that have different densities of the corresponding color.

5. A method as claimed in claim 4, further comprising the steps of:
   preparing a conversion table in advance;
   outputting, in accordance with the conversion table, color patches of each of the at least one basic color onto a recording medium using the plurality of inks that have different densities of the corresponding color;
   measuring density levels of the color patches; and
   preparing a tone correction table based on the measured density levels, and
   wherein the tone correction performing step performs the tone correction using the tone correction table, and the conversion step performs the conversion operation using the conversion table.

6. A method as claimed in claim 5, wherein the tone correction table is prepared to achieve a linear relationship between the color data of each of the at least one basic color and density levels to be obtained, the tone correction table being prepared by first producing a measurement curve that represents the density levels measured for the color patches and then by calculating a tone correction curve based on the measurement curve and on a predetermined linear line that represents the linear relationship.

7. A method as claimed in claim 5, wherein the plurality of different inks include a light ink having a predetermined density and a normal ink having another predetermined density greater than that of the light ink,
   wherein the conversion table represents, for each of the light and normal inks, correspondence between a plurality of sets of color data and a plurality of sets of converted color data, the converted color data for the normal ink having zero values in correspondence with the color data of values smaller than a predetermined reference value, and
   wherein the color patches are produced by using the conversion table to convert several sets of color data, which include one set of color data of the predetermined reference value, into several sets of converted color data for each of the light and normal inks, and by producing each of the several color patches based on the corresponding set of converted color data for the light ink and on the corresponding set of converted color data for the normal ink.

8. A method as claimed in claim 5, wherein a plurality of conversion tables are prepared for a plurality of different sets of printer characteristics, a plurality of tone correction tables being prepared for the plurality of different sets of printer characteristics, further comprising the steps of:
   selecting a set of printer characteristics, with which printing operation is desired to be performed;
   selecting one tone correction table from the plurality of tone correction tables in accordance with the selected set of printer characteristics, the tone correction performing step performing the tone correction using the selected tone correction table; and
   selecting one conversion table from the plurality of conversion tables in accordance with the selected set of printer characteristics, the conversion step performing converting operation using the selected conversion table.

9. An apparatus for recording a color image on a recording medium by expressing at least one basic color using a plurality of inks that have different densities of the corresponding color, the apparatus comprising:
   a table storing unit storing a plurality of conversion tables, each for converting color data of at least one basic color into converted color data of the plurality of inks that have different densities of the corresponding color, each conversion table matching one of a plurality of sets of printer characteristics;
   a printer characteristics selection unit selecting a set of printer characteristics, with which printing operation is desired to be performed;
   a table selection unit selecting one conversion table from the plurality of conversion tables in accordance with the selected set of printer characteristics;
   a conversion unit converting, based on the selected conversion table, the color data of each of the least one basic color into converted color data of the plurality of inks that have different densities of the corresponding color; and
   a printing unit performing printing operation to record a color image on a recording medium based on the converted color data with the selected set of printer characteristics.

10. An apparatus as claimed in claim 9, wherein the printer characteristics selecting unit includes a unit allowing a user to select his/her desired set of printer characteristics.

11. An apparatus for recording a color image on a recording medium by expressing at least one basic color using a plurality of inks that have different densities of the corresponding color, the apparatus comprising:
- a receiving unit receiving color data of at least one basic color;
- a conversion unit converting the color data of each of at least one basic color into converted color data of the plurality of inks that have different densities of the corresponding color, while performing tone correction on the color data of each of the at least one basic color; and
- a printing unit performing printing operation to record a color image on a recording medium based on the converted color data.

12. An apparatus as claimed in claim 11, wherein the conversion unit includes:
- a tone correction unit performing the tone correction on the received color data of each of the at least one basic color; and
- a converting unit converting the tone-corrected color data of each of the at least one basic color into the converted color data of the plurality of inks that have different densities of the corresponding color.

13. An apparatus as claimed in claim 12, further comprising a table storing unit storing a conversion table and a tone correction table, the tone correction table being produced based on the conversion table by measuring density levels of color patches for each of the at least one basic color, which are produced in accordance with the conversion table using the plurality of inks that have different densities of the corresponding color.
- wherein the tone correction unit performs the tone correction using the tone correction table, and the converting unit performs the conversion operation using the conversion table.

14. An apparatus as claimed in claim 13, wherein the tone correction table has a characteristic to attain a linear relationship between the color data of each of the at least one basic color and density levels to be obtained, the tone correction table being prepared by first producing a measurement curve that represents the density levels measured for the color patches and then by calculating a tone correction curve based on the measurement curve and on a predetermined linear line that represents the linear relationship.

15. An apparatus as claimed in claim 13, wherein the plurality of different inks include a light ink having a predetermined density and a normal ink having another predetermined density greater than that of the light ink,
- wherein the conversion table represents, for each of the light and normal inks, correspondence between a plurality of sets of color data and a plurality of sets of converted color data, the converted color data for the normal ink having zero values in correspondence with the color data of values smaller than a predetermined reference value, and
- wherein the color patches are produced by using the conversion table to convert several sets of color, data, which include one set of color data of the predetermined reference value, into several sets of converted color data for each of the light and normal inks, and by producing each of the several color patches based on the corresponding set of converted color data for the light ink and on the corresponding set of converted color data for the normal ink.

16. An apparatus as claimed in claim 13, wherein the table storing unit stores a plurality of conversion tables for a plurality of different sets of printer characteristics, and a plurality of tone correction tables for the plurality of different sets of printer characteristics, further comprising;
- a printer characteristic selection unit selecting a set of printer characteristics, with which printing operation is desired to be performed;
- a tone correction table selection unit selecting one tone correction table from the plurality of tone correction tables in accordance with the selected set of printer characteristics, the tone correction unit performing the tone correction using the selected tone correction table; and
- a conversion table selection unit selecting one conversion table from the plurality of conversion tables in accordance with the selected set of printer characteristics, the converting unit performing converting operation using the selected conversion table.

17. A data storage medium storing, in a manner readable by a computer, data of a program for recording a color image on a recording medium by expressing at least one basic color using a plurality of inks that have different densities of the corresponding color, the program comprising:
- a program of preparing a plurality of conversion tables, each for converting color data of at least one basic color into converted color data of the plurality of inks that have different densities of the corresponding color, each conversion table matching one of a plurality of sets of printer characteristics;
- a program of selecting a set of printer characteristics, with which printing operation is desired to be performed;
- a program of selecting one conversion table from the plurality of conversion tables in accordance with the selected set of printer characteristics;
- a program of converting, based on the selected conversion table, the color data of each of the least one basic color into converted color data of the plurality of inks that have different densities of the corresponding color; and
- a program of performing printing operation to record a color image on a recording medium based on the converted color data with the selected set of printer characteristics.

18. A data storage medium storing, in a manner readable by a computer, data of a program for recording a color image on a recording medium by expressing at least one basic color using a plurality of inks that have different densities of the corresponding color, the program comprising;
- a program of receiving color data of at least one basic color;
- a program of converting the color data of each of at least one basic color into converted color data of the plurality of inks that have different densities of the corresponding color, while performing tone correction on the color data of each of the at least one basic color; and
- a program of performing printing operation to record a color image on a recording medium based on the converted color data.

19. A data storage medium as claimed in claim 18, wherein after performing the tone correction on the received color data of each of the at least one basic color, the tone-corrected color data of each of the at least one basic color is converted into the converted color data of the plurality of inks that have different densities of the corresponding color.

* * * * *